United States Patent [19]

Nilssen

[11] Patent Number: 4,851,739
[45] Date of Patent: * Jul. 25, 1989

[54] CONTROLLED-FREQUENCY SERIES-RESONANT BALLAST

[76] Inventor: Ole K. Nilssen, Caesar Dr., Rt. 5, Barrington, Ill. 60010

[*] Notice: The portion of the term of this patent subsequent to Feb. 23, 2005 has been disclaimed.

[21] Appl. No.: 60,027

[22] Filed: Jun. 9, 1987

[51] Int. Cl.[4] ............................................. H05B 37/02
[52] U.S. Cl. .................................... 315/278; 315/244; 315/282; 315/284; 363/98; 363/132
[58] Field of Search ................. 315/DIG. 5, DIG. 7, 315/DIG. 2, 200 R, 278, 282, 284, 224, 127, 225, 244; 363/53, 34, 74, 75, 22, 100; 323/206, 247, 249, 250, 309, 310, 251, 252, 253, 254; 331/113 A, 114

[56] References Cited

U.S. PATENT DOCUMENTS

| | | | |
|---|---|---|---|
| 3,221,270 | 11/1975 | Tillman et al. | 331/113 A |
| 3,622,868 | 11/1971 | Toot | 323/250 |
| 3,681,654 | 8/1972 | Quinn | 315/DIG. 4 X |
| 3,757,201 | 9/1973 | Cornwell | 323/250 |
| 3,965,408 | 6/1976 | Higuchi et al. | 323/309 |
| 4,184,128 | 1/1980 | Nilssen | 315/DIG. 2 |
| 4,339,792 | 7/1982 | Yasumura et al. | 363/75 |
| 4,513,364 | 4/1985 | Nilssen | 331/113 A |
| 4,562,382 | 12/1985 | Elliot | 331/113 A |
| 4,600,872 | 7/1986 | Shepard, Jr. | 323/250 |
| 4,644,459 | 2/1987 | Nilssen | 331/113 A |
| 4,682,101 | 7/1987 | Cattaneo | 323/250 |
| 4,727,470 | 2/1988 | Nilssen | 363/132 |

Primary Examiner—James J. Groody
Assistant Examiner—Mark R. Powell

[57] ABSTRACT

In a self-oscillating inverter-type fluorescent lamp ballast, the inverter's output is a squarewave voltage of frequency controllable about 30 kHz. The squarewave voltage is applied across a series-connected high-Q L-C circuit. The fluorescent lamp is connected in parallel with the tank capacitor of this L-C circuit. Before the lamp ignites, the magnitude of the voltage developing across the tank capacitor is a sensitive function of the frequency of the squarewave voltage and is controlled to a suitable level by correspondingly controlling the frequency of the squarewave voltage to be higher than the natural resonance frequency of the unloaded L-C circuit. After the lamp has ignited, the magnitude of the lamp current is a sensitive function of the frequency of the squarewave voltage and is controlled to a suitable level by correspondingly controlling the frequency of the squarewave voltage.

20 Claims, 1 Drawing Sheet

CONTROLLED-FREQUENCY SERIES-RESONANT BALLAST

BACKGROUND OF THE INVENTION

1. Field of Invention

The present invention relates to a series-resonant inverter-type fluorescent lamp ballast wherein inversion frequency is automatically controlled such as to control the magnitudes of output voltage and output current.

2. Elements of Prior Art

In series-resonant inverter-type fluorescent lamp ballasts, one significant problem is that of controlling the magnitudes of circuit voltages and currents resulting when the output is unloaded. Another significant problem, which relates to both series-resonant and parallel-resonant ballasts, is that of maintaining an acceptably low lamp current crest factor in spite of the relatively large ripple voltages often present on the inverter's B+ voltage. Finally, another significant problem is that of minimizing variations in lamp power resulting from ordinary variations in the magnitude of the inverter's supply voltage.

SUMMARY OF THE INVENTION

1. Objects of the Invention

A general object of the present invention is that of providing a more cost-effective inverter-type ballast.

A more specific object is that of providing a self-oscillating series-resonant inverter-type fluorescent lamp ballast wherein the magnitudes of circuit voltages and currents are automatically controlled to desired levels.

These, as well as other objects, features and advantages of the present invention will become apparent from the following description and claims.

2. Brief Description

In its basic preferred embodiment, the present invention constitutes a power-line-operated self-oscillating inverter-type fluorescent lamp ballast comprising (a) a rectifier-filter arrangement operative to connect with a 60 Hz power line and to provide a DC supply voltage at a pair of DC terminals, the magnitude of the DC supply voltage having substantial variations at a fundamental frequency of 120 Hz;

(b) a half-bridge inverter connected with the DC terminals and operative to provide a squarewave output voltage at a pair of inverter terminals, the instantaneous magnitude of the squarewave output voltage being proportional to that of the DC supply voltage;

(c) a high-Q L-C series-combination connected across the inverter's output terminals, this L-C series-combination having a natural resonance frequency;

(d) a fluorescent lamp effectively connected in parallel with the tank capacitor of the L-C series-combination, the magnitude of the voltage developing across the tank capacitor prior to lamp ignition, and the magnitude of the current provided to the lamp after lamp ignition, both being dependent on the magnitude as well as of the frequency of the inverter's squarewave output voltage; and (e) frequency-controlling feedback means connected in circuit with the inverter's output, responsive to the magnitude of the inverter's output current, and operative to cause inverter self-oscillation at or near the natural resonance frequency of the L-C series-combination and in such manner as to increase the oscillation frequency as a sharp function of the magnitude of the inverter's output current, thereby to cause the magnitude of the current provided to the L-C circuit to remain nearly constant, regardless of the magnitude of the DC supply voltage as well as of the loading of the L-C series-combination.

Thus, with the magnitude of the current provided to the L-C series-combination controlled to be nearly constant, the magnitude of the open circuit voltage developing across the tank capacitor is maintained nearly constant, regardless of variations in the magnitude of the DC supply voltage. Similarly, after lamp ignition, the magnitude of the lamp current will remain nearly constant regardless of variations in the magnitude of the DC supply voltage.

DESCRIPTION OF THE PREFERRED EMBODIMENT

1. Details of Construction

Figure 1:
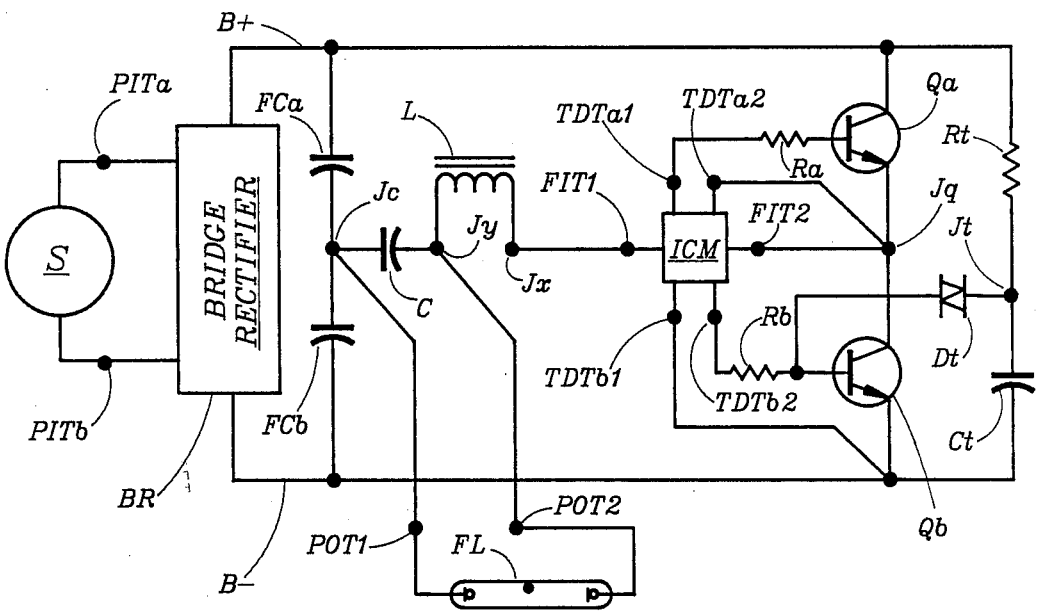
FIG. 1 provides a basic electrical circuit diagram of the preferred embodiment of the invention.

FIG. 1 schematically illustrates the electrical circuit arrangement of the preferred embodiment of the present invention.

In FIG. 1, a source S of ordinary 120 Volt/60 Hz power line voltage is applied to power input terminals PITa and PITb; which terminals, in turn, are connected with a bridge rectifier BR. The DC output from bridge rectifier BR is applied to a B+ bus and a B− bus, with the B+ bus being of positive polarity.

A first filter capacitor FCa is connected between the B+ bus and a junction Jc; and a second filter capacitor FCb is connected between junction Jc and the B− bus.

A first switching transistor Qa is connected with its collector to the B+ bus and with its emitter to a junction Jq.

A second switching transistor Qb is connected with its collector to junction Jq and with its emitter to the B− bus.

An inverter control means ICM has a pair of feedback input terminals FIT1 and FIT2, a first pair of transistor drive terminals TDTa1 and TDTa2, and a second pair of transistor drive terminals TDTb1 and TDTb2.

Input terminals FIT1 and FIT2 are respectively connected with junction Jq and a junction Jx; transistor drive terminals TDTa1 and TDTa2 are respectively connected with the base and the emitter of transistor Qa by way of a base-current-limiting resistor Ra; transistor drive terminals TDTb1 and TDTb2 are respectively connected with the emitter and the base of transistor Qb by way of a base-current-limiting resistor Rb.

A capacitor C is connected between junction Jc and a junction Jy; and an inductor L is connected between junctions Jy and Jx. Junctions Jc and Jy are respectively connected with power output terminals POT1 and POT2; across which output terminals is connected a fluorescent lamp FL.

A resistor Rt is connected between the B+ bus and a junction Jt; a capacitor Ct is connected between junction Jt and the B− bus; and a Diac Dt is connected between junction Jt and the base of transistor Qb.

Figure 2:
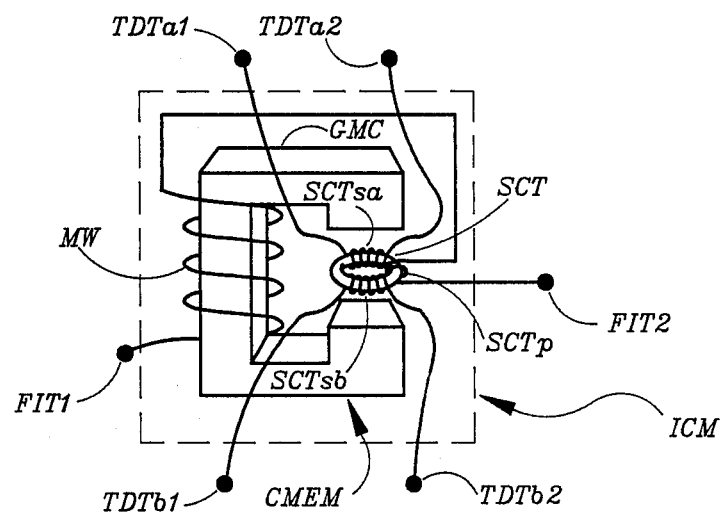
FIG. 2 provides a detailed view of the frequency control means, including the saturable current feedback transformer and the adjacently positioned cross-magnetizing electro-magnet.

FIG. 2 provides details of inverter control means ICM.

In FIG. 2, a saturable current transformer SCT has: (i) a primary winding SCTp, (ii) a first secondary winding SCTsa connected between the first pair of transistor drive terminals TDTa1 and TDTa2, and (iii) a second secondary winding SCTsb connected between the second pair of transistor drive terminals TDTb1 and TDTb2.

A cross-magnetizing electro-magnet CMEM has a gapped magnetic core GMC; and saturable current transformer SCT is positioned within the gap thereof.

Gapped magnetic core GMC has a magnetizing winding MW; which magnetizing winding is connected in series with primary winding SCTp of saturable current transformer SCT to form a series-combination; and this series-combination is connected between first and second feedback inout terminals FIT1 and FIT2.

2. Details of Operation

The operation of the half-bridge inverter of FIG. 1 is conventional and is explained in conjunction with FIG. 8 of U.S. Pat. No. Re. 31,758 to Nilssen. However, as indicated in FIG. 2, only a single saturable current feedback transformer is used instead of the two saturable current feedback transformers shown in Nilssen's FIG. 8. The resulting difference in operation is of no consequence in connection with the present invention.

Due to the resonance-effect of the high-Q L-C circuit, the magnitude of the current flowing into the L-C circuit is a sensitive function of the inverter's oscillating frequency, especially when the L-C circuit is unloaded. In turn, the inverter's oscillating frequency is dependent on the magnetic flux saturation characteristics of the magnetic core of the saturable current transformer SCT; which saturable current transformer is used in the positive feedback circuit of the self-oscillating inverter.

Details in respect to the effect of the magnetic flux saturation characteristics on the inverter's oscillation frequency are provided in U.S. Pat. No. 4,513,364 to Nilssen.

Specifically, as the saturation flux density of the saturable current transformer is reduced, the inverter's oscillation frequency increases—and vice versa.

One way of reducing the transformer's saturation flux density is that of increasing the temperature of the ferrite magnetic core used in that transformer; which effect is further explained in U.S. Pat. No. 4,513,364 to Nilssen.

Another way of reducing the transformer's saturation flux density is that of subjecting the transformer's ferrite magnetic core to a cross-magnetizing flux, such as from an adjacently placed permanent magnet or electro-magnet. That way, the saturation flux density of the transformer's ferrite magnetic core decreases with increasing cross-magnetizing flux.

With reference to FIGS. 1 and 2, the detailed operation of the inverter's frequency control feature may be understood as follows.

(a) When saturable current transformer SCT is not subjected to a cross-magnetizing field, the ON-time of each transistor (Qa/Qb) will be determined by the time it takes for the magnetic core in SCT to saturate due only to the saturating effect resulting from the current flowing through its primary winding SCTp. This saturating effect, in turn, results from the magnitude of the voltage developing across its primary winding as integrally combined with the length of time that this voltage is present thereacross (i.e., the integral number of Volt-seconds). Thus, for a given magnetic core and number of turns on the primary winding, whenever a certain given amount of Volt-seconds has been accumulated across this primary winding, saturation occurs.

With the resistance of resistors Ra/Rb negligibly small—as is ordinarily the case in other self-oscillating inverters with current feedback—the magnitude of the voltage developing across primary winding SCTp as a result of current flowing through it is substantially independent of the magnitude of this current. (This is so because the magnitude of the base-emitter voltage of each of transistors Qa/Qb is essentially constant as long a forward base current is flowing.) Thus, the length of time it takes for transformer SCT to reach saturation is essentially constant, regardless of the magnitude of the current flowing through its primary winding.

As a net overall result, the frequency of oscillation of the inverter will be substantially unaffected by the magnitude of the current drawn from its output.

(b) However, with the resistance of resistors Ba/Rb not being negligibly small—which situation represents one version of the preferred embodiment of the instant invention—the magnitude of the voltage developing across primary winding SCTp will not be independent of the magnitude of the current flowing through this primary winding. On the contrary, the magnitude of the voltage developing across the primary winding will now be a sensitive function of the magnitude of the current flowing therethrough.

Thus, with resistors Ra/Rb having significant resistance values, the length of time it will take for transformer SCT to saturate will become shorter as the magnitude of the current flowing through its primary winding increases; which is to say that the ON-time of each transistor will become shorter as the current drawn from the inverter's output increases in magnitude.

As an overall net result, the frequency of oscillation of the inverter will increase in proportion to the magnitude of the current drawn from the inverter's output.

(c) When saturable current transformer SCT is subjected to a cross-magnetizing field, the effects are more complex and harder to understand. However, a good degree of understanding may be achieved by considering an ideal situation where resistors Ra/Rb have negligible resistance values and where the amount of Volt-seconds accumulated across primary winding SCTp has negligible effect on saturation. Under these conditions, transformer SCT will provide for positive feedback until the magnitude of the current flowing through magnetizing winding MW reaches the point at which the cross-magnetizing field causes the magnetic core of transformer SCT to become saturated; at which point transformer SCT will cease to provide output current.

In other words, when being cross-magnetized as a direct function of the magnitude of the inverter's output current, each transistor will remain in its ON-state only long enough for the current through it to reach a given magnitude; at which point its base drive will be removed as a result of the core of the feedback transformer having become saturated.

As a net overall result, the frequency of oscillation of the inverter will be whatever is required to limit the peak magnitude of the inverter's output current to a given level. Thus, with feedback controlled by cross-magnetization as herein described, the peak magnitude of the current available from the inverter's output will be substantially constant.

(d) Under the condition where resistors Ra/Rb have negligible resistance values, but where saturable current transformer SCT saturates under the combined influence of the cross-magnetizing field as well as the Volt-second integral accumulating across its primary winding, the net overall results will be:

(i) for low levels of inverter output current, the inverter's oscillating frequency will essentially be determined by the Volt-second integral cumulated across primary winding SCTp, and will therefore be substantially constant;

(ii) as the magnitude of the inverter output current increases, the inverter's oscillation frequency will eventually start to increase along with the magnitude of the inverter output current; until (iii) a point is reached at which the magnitude of the inverter's output current can not be increased any longer, and where the inverter's oscillation frequency will simply increase enough to prevent the output current from increasing any further.

In view of the above explanations, the frequency-controlling features of the circuit represented by FIGS. 1 and 2 will be understood to be as follows.

(e) With the inverter oscillating at the natural resonance frequency of the unloaded L-C series-circuit, and with fluorescent lamp FL non-connected or non-operative, the magnitude of the current flowing from the inverter's output would become exceedingly high after but a few cycles of oscillation. However, due to the effect of resistors Ra/Rb and/or the cross-magnetizing field, as the magnitude of the inverter's output current increases, the inverter's oscillating frequency will increase, thereby limiting the magnitude of the output current in a negative feedback manner.

The sharpness of the limitation on the magnitude of the output current will depend on the combination of the various parameters: the resistance values of resistors Ra/Rb; the magnitude of the current required by magnetizing winding MW to cause saturation of the magnetic core of transformer SCT by cross-magnetization; and the Volt-second integral required to be accumulated across the primary winding of transformer SCT before its magnetic core will saturate.

A significantly useful effect is attained even without the use of the cross-magnetizing field. However, a much more substantial effect is attained when using cross-magnetization.

Thus, with the unloaded L-C series-circuit connected across the inverter's output, the magnitude of the inverter's output current is prevented from reaching destructingly high levels. Rather, by proper choice of parameters, the magnitude of the output current can be made just so high as to cause the magnitude of the voltage developing across tank-capacitor C to reach a level appropriate for effective starting of the fluorescent lamp.

On the other hand, with the fluorescent lamp loading the L-C series-circuit, the magnitude of the current drawn from the inverter's output will be limited even if the inverter oscillates at or near the natural resonance frequency of the loaded L-C circuit.

Since the basic nature of fluorescent lamps is such that lamp starting voltage is much larger in magnitude than is lamp operating voltage, the overall result—in the circuit of FIG. 1— is such that the magnitude-limitation on the inverter output current will indeed have the desired effect of preventing circuit damage while providing for an adequately high lamp starting voltage, while constituting no limitations on regular lamp operation.

Or, as seen from another aspect angle, the magnitude of the current required to cause an adequately high lamp starting voltage to develop across capacitor C is much larger than that of the current required to develop across C to provide for an adequately high lamp operating voltage. (In this context, the lamp operating current can be effectively ignored for the reasons that: (i) it will be in quadrature with, and of magnitude similar to that of, the reactive current flowing through capacitor C; and (ii) the frequency of inverter oscillation will be substantially lower during regular lamp operation.)

As a net overall result, the ballast circuit of FIG. 1 will permit the establishment of a situation where: (i) after lamp ignition, when the fluorescent lamp operates in normal manner, the inverter's oscillating frequency is approximately equal to the natural resonance frequency of the loaded L-C circuit, which implies highly efficient operation in that the inverter's output current will be substantially in phase with its output voltage; and (ii) before lamp ignition, or with no lamp connected, the inverter's oscillating frequency increases to a point of limiting the inverter's output current to a level just sufficient to cause a suitable lamp starting voltage to develop across capacitor C, at which point the inverter's output current will be about 90 degrees phase-delayed with respect to its output voltage.

Additional Comments (f) In addition to preventing destructively high circuit currents and/or voltages, one important implication of controlling the magnitude of the inverter's output current as indicated by the arrangement of FIGS. 1 and 2 is that of providing for a high level of light output regulation: if the magnitude of the power line voltage were to change from its nominal value by a given percentage, the light output from the fluorescent lamp would change by a smaller percentage than otherwise would have been the case.

(g) Another important implication of controlling the magnitude of the inverter's output current is that of being able to provide for improved lamp current crest factor.

(h) Detailed information relative to a fluorescent lamp ballast wherein the fluorescent lamp is powered by way of a series-excited parallel-loaded L-C resonant circuit is provided in U.S. Pat. No. 4,554,487 to Nilssen.

One effect of such a ballasting arrangement is that of making the waveshape of the voltage provided across the output to the fluorescent lamps very nearly sinusoidal, even though the output from the inverter itself, at the input to the series-resonant L-C circuit, is basically a squarewave.

(i) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
DC source means providing a DC voltage at a set of DC terminals;
inverter means connected with the DC terminals and operative to provide an AC voltage at a set of AC terminals, the inverter means having frequency control means operative in response to a frequency-controlling input to control the frequency of the AC voltage;

sensing means connected in circuit with the AC terminals and operative in response to the magnitude of an output current flowing therefrom to provide said frequency-controlling input, thereby to control the frequency of the AC voltage in such manner as to cause this frequency to increase in response to an increase in the magnitude of the output current; and load means connected with the AC terminals and operative to receive the output current, the magnitude of the output current decreasing in response to increasing frequency of the AC voltage, the load means comprising gas discharge lamp means;

whereby any variations in the magnitude of the output current are attenuated due to actions by the frequency control means.

2. The arrangement of claim 1 wherein the sensing means comprises saturable magnetic inductor means.

3. The arrangement of claim 1 wherein the inverter means is of the self-oscillating type.

4. The arrangement of claim 1 wherein the frequency control means comprises saturable inductor means.

5. The arrangement of claim 1 wherein the load means comprises an L-C circuit.

6. The arrangement of claim 5 wherein the L-C circuit has a natural resonance frequency lower than the frequency of the AC voltage.

7. The arrangement of claim 5 wherein: (i) the L-C circuit comprises a tank-capacitor and is series-connected across the AC terminals, and (ii) the gas discharge lamp means is effectively connected in parallel with the tank-capacitor.

8. An arrangement comprising:

DC source means providing a DC voltage at a set of DC terminals, the DC voltage exhibiting periodic variations in magnitude;

gas discharge lamp means having a set of lamp terminals;

inverter means connected with the DC terminals and operative to provide a squarewave voltage at a set of squarewave terminals, the inverter means having frequency control input means operative in response to a frequency-controlling input to control the fundamental frequency of the squarewave voltage;

an L-C series-circuit effectively connected across the squarewave terminals, the L-C series-circuit comprising a tank capacitor, the lamp terminals being effectively connected in parallel-circuit with the tank capacitor, thereby to cause an AC current to be supplied to the gas discharge lamp means, the magnitude of this AC current being a function of the magnitude of the DC voltage as well as of the frequency of the squarewave voltage; and sensing means connected in circuit with the squarewave terminals and the frequency control input means, the sensing means being responsive to the magnitude of the current flowing from the squarewave terminals and operative to provide said frequency-controlling input to the frequency control input means, thereby to cause the magnitude of the AC current to remain relatively constant regardless of the periodic variations in the magnitude of the DC voltage.

9. An arrangement comprising:

DC source means providing a DC voltage at a set of DC terminals;

inverter means connected with the DC terminals and operative to provide a squarewave voltage at a set of squarewave terminals, the squarewave voltage being operative to cause an output current to flow from the squarewave terminals, the inverter means comprising control means responsive to the magnitude of the output current and operative to increase the fundamental frequency of the squarewave voltage in the event that this magnitude were to increase above a certain level; and frequency-responsive load means connected with the squarewave terminals and operative to receive the output current, the load means comprising gas discharge lamp means and exhibiting an impedance to the load current that increases with the frequency of the squarewave voltage; thereby, by action of the control means, to cause attenuation of any variations in the magnitude of the output current.

10. An arrangement comprising:

rectifier means operative to connect with the AC voltage on an ordinary electric utility power line and to provide a DC supply voltage at a pair of DC terminals, the magnitude of the DC supply voltage varying synchronously with the instantaneous absolute magnitude of the AC voltage;

inverter means connected with the DC terminals and operative to convert the DC supply voltage to a squarewave voltage having an instantaneous absolute magnitude proportional to that of the DC supply voltage and being provided at a squarewave output, the inverter means having control input means and being operative in response to a control signal provided thereto to change the frequency of the squarewave voltage;

frequency-responsive circuit means connected with the squarewave output and operative to provide a substantially sinusoidal voltage at a pair of output terminals;

gas discharge lamp means connected with the output terminals and operative to receive a lamp current therefrom, the magnitude of the lamp current being a function of the magnitude of the DC supply voltage as well as of the frequency of the squarewave voltage; and sensor means responsive to the magnitude of an output current flowing from the squarewave output and operative to provide said control signal, thereby to effect adjustment of the frequency of the squarewave voltage such that the magnitude of the output current remains relatively constant irrespective of the variations in the magnitude of the DC supply voltage.

11. An arrangement comprising:

DC source means providing a DC voltage at a set of DC terminals;

inverter means connected with the DC terminals and operative to provide an AC voltage at a set of AC output terminals;

load means connected with the AC output terminals and operative to draw an output current therefrom, the load means comprising gas discharge lamp means; and control means connected in circuit with the inverter means and operative to cause the fundamental frequency of the AC voltage to increase with increasing magnitude of the output current.

12. The arrangement of claim 11 wherein the load means comprises frequency-discriminating impedance means.

13. The arrangement of claim 11 wherein the control means is responsive to the instantaneous magnitude of the output current.

14. An arrangement comprising:
a source having control input means and being operative to provide an AC voltage across a pair of AC terminals, the magnitude of the AC voltage exhibiting periodic variations, the frequency of the AC voltage being adjustable above a certain base frequency in response to a control signal received at the control input means;
a series-combination of an inductor and a capacitor connected across the AC terminals, the series-combination: (i) being resonant at or near the base frequency, (ii) being operative to draw an AC current from the AC terminals, and (iii) having a pair of output terminals effectively parallel-connected with the capacitor;
gas discharge lamp means connected with the output terminals and operative to receive a lamp current therefrom, the magnitude of the lamp current being a function of the magnitude as well as the frequency of the AC voltage; and
sensor means responsive to the magnitude of the AC current and operative to provide said control signal, thereby to effect adjustment of the frequency of the AC voltage such that the magnitude of the AC current, as well as that of the lamp current, remain relatively constant irrespective of the periodic variations in the magnitude of the AC voltage.

15. The arrangement of claim 14 wherein the frequency of said periodic variations is on the order of 120 Hz and wherein the base frequency is on the order of 30 kHz.

16. The arrangement of claim 14 wherein the lamp current has a crest factor and wherein this crest factor is substantially reduced by virtue of the action of the control means.

17. An arrangement comprising:
a source having control input means and being operative to provide an AC voltage across a pair of AC terminals, the magnitude of the AC voltage exhibiting periodic variations, the frequency of the AC voltage being adjustable above a certain base frequency in response to a control signal received at the control input means;
gas discharge lamp means having a set of lamp terminals;
frequency-responsive current-limiting means connected in circuit between the AC terminals and the lamp terminals, thereby to provide a lamp current to the gas discharge lamp, the magnitude of this lamp current being a function of the frequency of the AC voltage;
sensor means responsive to the magnitude of an output current flowing from the AC terminals and operative to provide said control signal, thereby to effect adjustment of the frequency of the AC voltage in such manner as to maintain the lamp current at a substantially constant magnitude irrespective of the variations in the magnitude of the AC voltage.

18. An arrangement comprising:
DC source means providing a DC voltage at a set of DC terminals;
inverter means connected with the DC terminals and operative to provide an AC voltage to a set of AC terminals, the inverter means having switching transistor means operative: (i) to conduct current in response to the presence of a switching signal, (ii) not to conduct current in response to the absence of a switching signal, and (iii) to cause the AC voltage to be provided in response to periodic provision of the switching signal;
load means connected with the AC terminals and operative to draw a load current therefrom, the load means comprising gas discharge lamp means; and
switching means operative periodically to provide the switching signal, the switching signal being derived from and having a duration dependent on the magnitude of the load current 19. The arrangement of claim 18 wherein the duration of the switching signal gets shorter as the magnitude of the output current increases.

20. The arrangement of claim 18 wherein the duration of the switching signal is determined by the peak magnitude of the output current.

* * * * *